(12) United States Patent
Xu et al.

(10) Patent No.: US 10,366,211 B2
(45) Date of Patent: Jul. 30, 2019

(54) METHOD, DEVICE AND APPARATUS FOR RECOGNIZING PICTURE

(71) Applicant: BAIDU ONLINE NETWORK TECHNOLOGY (BEIJING) CO., LTD., Beijing (CN)

(72) Inventors: Yingbo Xu, Beijing (CN); Xuecheng Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 29 days.

(21) Appl. No.: 15/618,402

(22) Filed: Jun. 9, 2017

(65) Prior Publication Data

US 2018/0165553 A1 Jun. 14, 2018

(30) Foreign Application Priority Data

Dec. 9, 2016 (CN) .......................... 2016 1 1130686

(51) Int. Cl.
*G06K 9/00* (2006.01)
*G06F 21/10* (2013.01)
*G06F 16/583* (2019.01)
*G06F 21/16* (2013.01)
*G06K 9/46* (2006.01)
*G06K 9/62* (2006.01)

(52) U.S. Cl.
CPC .......... *G06F 21/10* (2013.01); *G06F 16/5838* (2019.01); *G06F 21/16* (2013.01); *G06K 9/4671* (2013.01); *G06K 9/6212* (2013.01)

(58) Field of Classification Search
CPC .. G06K 9/6267; G06K 9/4604; G06K 9/6202; G06F 21/10; G06F 17/30256; G06F 17/30
See application file for complete search history.

(56) References Cited

U.S. PATENT DOCUMENTS 6,112,010 A * 8/2000 Koyama ................ G11B 20/12
375/E7.027
8,717,857 B2 * 5/2014 Spitzlinger ............. G06F 21/10
369/30.09

(Continued)

FOREIGN PATENT DOCUMENTS

CN 104462481 3/2015
CN 105551044 5/2016

*Primary Examiner* — Amir Alavi
(74) *Attorney, Agent, or Firm* — Lathrop Gage LLP (57) ABSTRACT

The present application discloses a method for recognizing a picture, device, and apparatus. The method comprises: acquiring a to-be-recognized picture from an Internet-based on-line database; extracting characteristics from the to-be-recognized picture and a previously acquired copy-righted picture, to obtain the characteristics of the to-be-recognized picture and the copy-righted picture; comparing the extracted characteristics of the to-be-recognized picture and the copy-righted picture; and determining the to-be-recognized pictures as a suspected pirated picture based on the comparison result. According to the technical solutions provided by the embodiments of the present application, suspected pirated pictures can be accurately and quickly recognized, with no need of manual screening, thereby greatly reducing the labor cost, and increasing the recognition efficiency for suspected pirated pictures.

12 Claims, 5 Drawing Sheets

(56) References Cited

U.S. PATENT DOCUMENTS

| | | | | |
|---|---|---|---|---|
| 9,704,127 | B2* | 7/2017 | Bock | G06Q 30/012 |
| 2002/0126762 | A1* | 9/2002 | Tanaka | H04N 7/163 |
| | | | | 375/240.25 |
| 2007/0223332 | A1* | 9/2007 | Fujinami | G11B 27/105 |
| | | | | 369/47.22 |
| 2007/0237051 | A1* | 10/2007 | Kawai | G11B 7/0037 |
| | | | | 369/100 |
| 2009/0110366 | A1* | 4/2009 | Ogikubo | G06F 17/30802 |
| | | | | 386/353 |
| 2012/0155233 | A1* | 6/2012 | Spitzlinger | G06F 21/10 |
| | | | | 369/30.09 |
| 2018/0165553 | A1* | 6/2018 | Xu | G06F 17/30256 |

* cited by examiner

METHOD, DEVICE AND APPARATUS FOR RECOGNIZING PICTURE

CROSS-REFERENCE TO RELATED APPLICATION

This application claims the priority of Chinese Patent Application No. 201611130686.1, entitled "Method, Device and Apparatus for Recognizing Picture," filed on Dec. 9, 2016, the content of which is incorporated herein by reference in its entirety.

TECHNICAL FIELD

The present disclosure generally relates to the field of computer technologies, particularly to the field of picture recognition, and more particularly to a method, device, and apparatus for recognizing pirated pictures.

BACKGROUND

In recent years, with the development of networks, one often browses different kinds of pictures online. Each copy-righted picture is copyrighted, and the picture can only be legally used if the copyright of the picture is purchased. In practice, the pictures are often misappropriated by some websites, that is, the pictures are used without purchasing the copyright of the picture, so the pictures displayed on the website are pirated pictures.

At present, the way to combat pirated pictures is achieved through artificial means, by artificially visually comparing to find pirated pictures out and then legally defending the rights. Such a way of artificial screening is slow, resulting in a very low recognition efficiency.

SUMMARY

In view of the defects or disadvantages existing in the conventional art, it is desirable to provide a solution that can effectively increase the recognition efficiency for the pirated pictures.

In a first aspect, an embodiment of the present application provides a method for recognizing a picture, comprising: acquiring a to-be-recognized picture from an Internet-based on-line database;

extracting characteristics from the to-be-recognized picture and a previously acquired copy-righted picture, to obtain the characteristics of the to-be-recognized picture and the copy-righted picture;

comparing the extracted characteristics of the to-be-recognized picture and the copy-righted picture; and determining the to-be-recognized picture as a suspected pirated picture based on the comparison result.

In a second aspect, an embodiment of the present application further provides a device for recognizing a picture, comprising: an acquisition module, configured to acquire a to-be-recognized picture from an Internet-based on-line database;

a characteristic extraction module, configured to extract characteristics from the to-be-recognized picture acquired by the acquisition module and a previously acquired copy-righted picture, to obtain the characteristics of the to-be-recognized picture and the copy-righted picture;

a characteristic comparison module, configured to compare the characteristics of the to-be-recognized picture and the copy-righted picture extracted by the characteristic extraction module; and a determination module, configured to determine the to-be-recognized picture as a suspected pirated picture based on the comparison result obtained by the characteristic comparison module.

In a third aspect, an embodiment of the present application also provides an apparatus for recognizing a picture, comprising a processor, a storage medium, and a display, the storage medium comprising instructions executable by the processor, such that the processor executes:

acquiring a to-be-recognized picture from an Internet-based on-line database;

extracting characteristics from the to-be-recognized picture and a previously acquired copy-righted picture, to obtain the characteristics of the to-be-recognized picture and the copy-righted picture;

comparing the extracted characteristics of the to-be-recognized picture and the copy-righted picture; and determining the to-be-recognized picture as a suspected pirated picture based on the comparison result.

According to the solutions for recognizing pirated pictures provided by the embodiments of the present application, characteristics are extracted from a previously acquired copy-righted picture and to-be-recognized pictures acquired from an Internet-based on-line database, the extracted characteristics are then compared, and suspected pirated pictures are determined from the to-be-recognized pictures based on the comparison result, thereby achieving the rapid recognition of pirated pictures. According to the technical solutions provided by the embodiments of the present application, suspected pirated pictures can be accurately and quickly recognized without manual screening, thereby greatly reducing the labor cost, and increasing the recognition efficiency for suspected pirated pictures.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
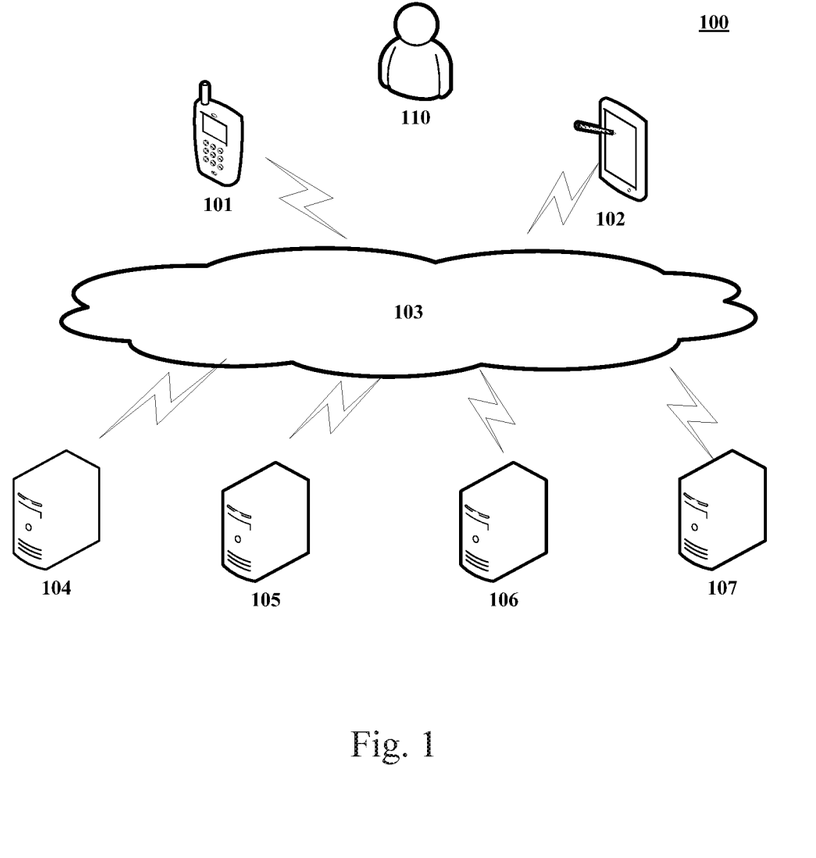
FIG. 1 shows an exemplary system architecture in which an embodiment of the present application may be applied.

FIG. 1 shows an exemplary architecture of a system 100 which may be used by an embodiment of the present application.

As shown in FIG. 1, the system architecture 100 may include terminal devices 101 and 102, a network 103 and servers 104, 105, 106 and 107. The network 103 serves as a medium providing a communication link between the terminal devices 101, and 102 and the servers 104, 105, 106 and 107. The network 103 may include various types of connections, such as wired or wireless transmission links, or optical fibers.

The user 110 may use the terminal devices 101, and 102 to interact with the servers 104, 105, 106 and 107 through the network 103, in order to access various services, such as browsing webpages and downloading data. Various applications, for example cloud service applications through the Uniform Resource Locator (URL), including but not limited to browsers, security applications may be installed on the terminal devices 101, 102 and 103.

The terminal devices 101, and 102 may be various electronic devices capable of interacting with the server, including but not limited to, personal computers, smart phones, smart TVs, tablet computers, personal digital assistants and e-book readers.

The servers 104, 105, 106 and 107 may be servers providing various services. The servers may provide services in response to the service request by the users. It should be appreciated that a server may provide one or more services, and a service may be provided by a plurality of servers.

It should be appreciated that the numbers of the terminal devices, the networks and the servers in FIG. 1 are merely illustrative. Any number of terminal devices, networks and servers may be provided based on the actual requirements.

Figure 2:
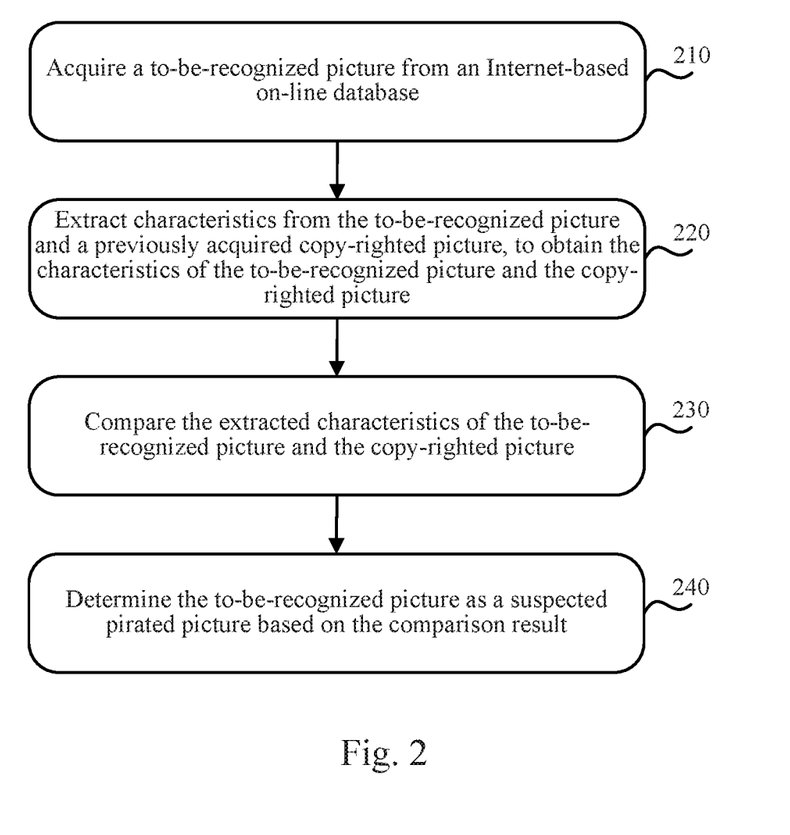
FIG. 2 shows an exemplary flow chart of a method for recognizing a picture according to an embodiment of the present application.

FIG. 2 shows an exemplary flow chart of a method for recognizing a picture according to an embodiment of the present application. The method shown in FIG. 2 may be implemented at the server side or at the terminal device side in FIG. 1. Specifically, as shown in FIG. 2, the method comprises the following.

Step 210: Acquire a to-be-recognized picture from an Internet-based on-line database.

In this embodiment, the to-be-recognized picture is one of the pictures for viewing on the net, most of which are stored in Internet-based on-line databases. Because a huge number of pictures are stored in the Internet-based on-line databases, suspected pirated pictures on the net are ensured to be more likely recognized.

Step 220: Extract characteristics from the to-be-recognized picture and a previously acquired copy-righted picture, to obtain the characteristics of the to-be-recognized picture and the copy-righted picture.

In this embodiment, the copy-righted picture may be provided previously by a copyright owner of the copy-righted picture.

Additionally, in this embodiment, the extracted characteristics of the to-be-recognized picture and the copy-righted picture may include, but are not limited to:

a color characteristic and a shape characteristic, the color characteristic being mainly characterized by a 64-dimensional histogram in HSV space of a color model; and the shape characteristic being mainly characterized by 1024-dimensional scale-invariant characteristic transform (SIFT) of an image.

Step 230: Compare the extracted characteristics of the to-be-recognized picture and the copy-righted picture.

In this embodiment, this step may be, without limitation, implemented as follows: establishing characteristic indices of the extracted characteristics of the to-be-recognized picture; and cross-comparing the extracted characteristics of the to-be-recognized picture and the copy-righted picture based on the established characteristic indices.

The comparison efficiency may be increased to the greatest extent through cross-comparison of the extracted characteristics of the to-be-recognized picture and the copy-righted picture by establishing the characteristic indices.

Step 240: Determine the to-be-recognized picture as a suspected pirated picture based on the comparison result.

In this embodiment, the comparison result may be, but is not limited to, a similarity between the copy-righted picture and the to-be-recognized picture. Therefore, based on the similarity between the copy-righted picture and the to-be-recognized picture, the to-be-recognized picture with a similarity to the copy-righted picture that is not less than a preset similarity threshold is determined as a suspected pirated picture.

The preset similarity threshold may be a value greater than 0 and not more than 1. When the similarity threshold is 1, a to-be-recognized picture can be determined as a suspected pirated picture only when the to-be-recognized picture is absolutely the same as the copy-righted picture and the similarity is 100 percent. When the similarity threshold is less than 1, a to-be-recognized picture is determined as a suspected pirated picture when the to-be-recognized picture is partially similar to the copy-righted picture, because a scenario may exist in which only part of the contents of the copy-righted picture is misappropriated.

Figure 3:
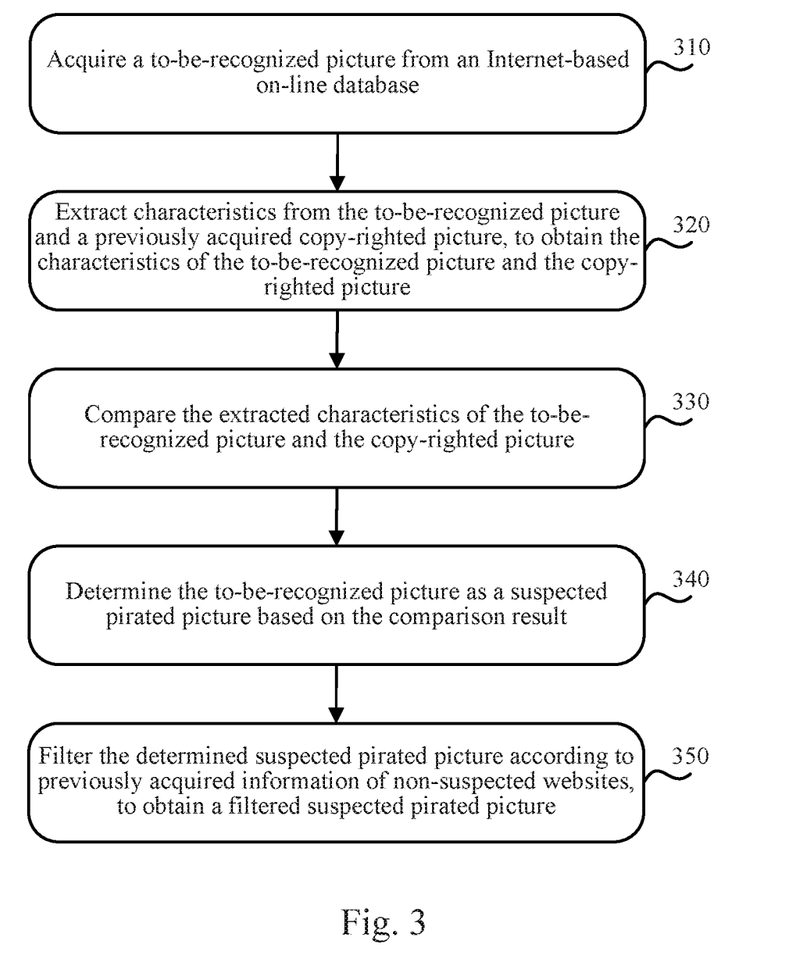
FIG. 3 shows an exemplary flow chart of a method for recognizing a picture according to another embodiment of the present application.

FIG. 3 shows an exemplary flow chart of a method for recognizing a picture according to another embodiment of the present application.

As shown in FIG. 3, the method comprises specifically the following.

Step 310: Acquire a to-be-recognized picture from an Internet-based on-line database.

Step 320: Extract characteristics from the to-be-recognized picture and a previously acquired copy-righted picture, to obtain the characteristics of the to-be-recognized picture and the copy-righted picture.

Step 330: Compare the extracted characteristics of the to-be-recognized picture and the copy-righted picture.

Step 340: Determine the to-be-recognized picture as a suspected pirated picture based on the comparison result.

The implementations of Steps 310 to 340 are the same as those of Steps 210 to 240 in the embodiment shown in FIG. 2, and thus are not elaborated here again.

Step 350: Filter the determined suspected pirated picture according to previously acquired information of non-suspected websites, to obtain a filtered suspected pirated picture.

In this embodiment, the information of non-suspected websites may be a white list obtained from a copyright owner, that is, users of the picture that have purchased the copyright, or users of the picture previously determined in this embodiment that have not used pirated pictures.

Then, information of the filtered suspected pirated picture is sent to the corresponding copyright owner, for right defense by the copyright owner.

Compared with the embodiment shown in FIG. 2, in the embodiment shown in FIG. 3, after being determined from the to-be-recognized picture, the suspected pirated picture is further filtered according to previously acquired information of non-suspected websites, to increase the accurate recognition rate.

It should be noted that although the operations of the method according to the present disclosure have been described in a particular order in the drawings, it is not intended or implied that these operations must be performed in that particular order, or that all of the operations shown must be performed in order to achieve the desired result. In contrast, the order of the steps depicted in the flow chart may be changed.

Figure 4:
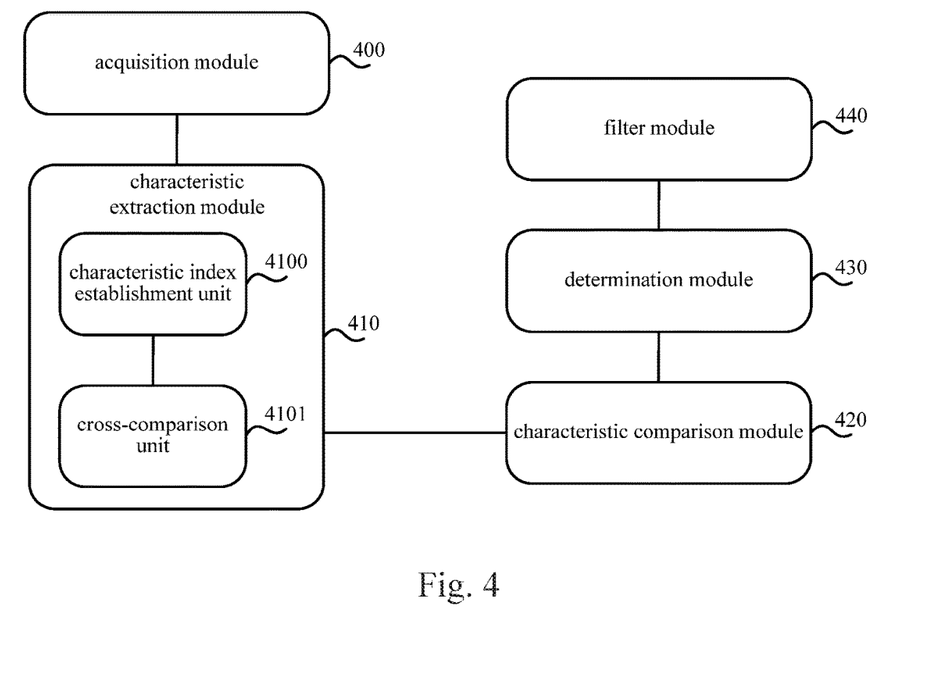
FIG. 4 shows an exemplary structural block diagram of a device for recognizing a picture according to an embodiment of the present application.

FIG. 4 shows an exemplary structural block diagram of a picture recognition device according to an embodiment of the present application.

As shown in FIG. 4, the device for recognizing a picture comprises: an acquisition module 400, configured to acquire a to-be-recognized picture from an Internet-based on-line database;

a characteristic extraction module 410, configured to extract characteristics from the to-be-recognized picture acquired by the acquisition module 400 and a previously acquired copy-righted picture, to obtain the characteristics of the to-be-recognized picture and the copy-righted picture;

a characteristic comparison module 420, configured to compare the characteristics of the to-be-recognized picture and the copy-righted picture extracted by the characteristic extraction module 410; and a determination module 430, configured to determine the to-be-recognized picture as a suspected pirated picture based on the comparison result obtained by the characteristic comparison module 420.

The characteristic comparison module 410 comprises: a characteristic index establishment unit 4100, configured to establish characteristic indices of the extracted characteristics of the to-be-recognized picture; and a cross-comparison unit 4101, configured to cross-compare the extracted characteristics of the to-be-recognized picture and the copy-righted picture based on the characteristic indices established by the characteristic index establishment unit 4010.

The comparison result is a similarity between the copy-righted picture and the to-be-recognized picture.

Accordingly, the determination module 430 is configured to: determine a to-be-recognized picture with a similarity to the copy-righted picture not less than a preset similarity threshold as a suspected pirated picture.

The device further comprises: a filter module 440, configured to filter the suspected pirated picture determined by the determination module according to previously acquired information of non-suspected websites, to obtain a filtered suspected pirated picture.

The characteristics of the copy-righted picture and the to-be-recognized picture include at least: a color characteristic and a shape characteristic.

It should be understood that each sub-system or unit in the system corresponds to each step in the methods described with reference to FIGS. 2-3. Therefore, the operations and characteristics described above with respect to the methods are also applicable to the system and units contained therein, and are not elaborated here again.

Figure 5:
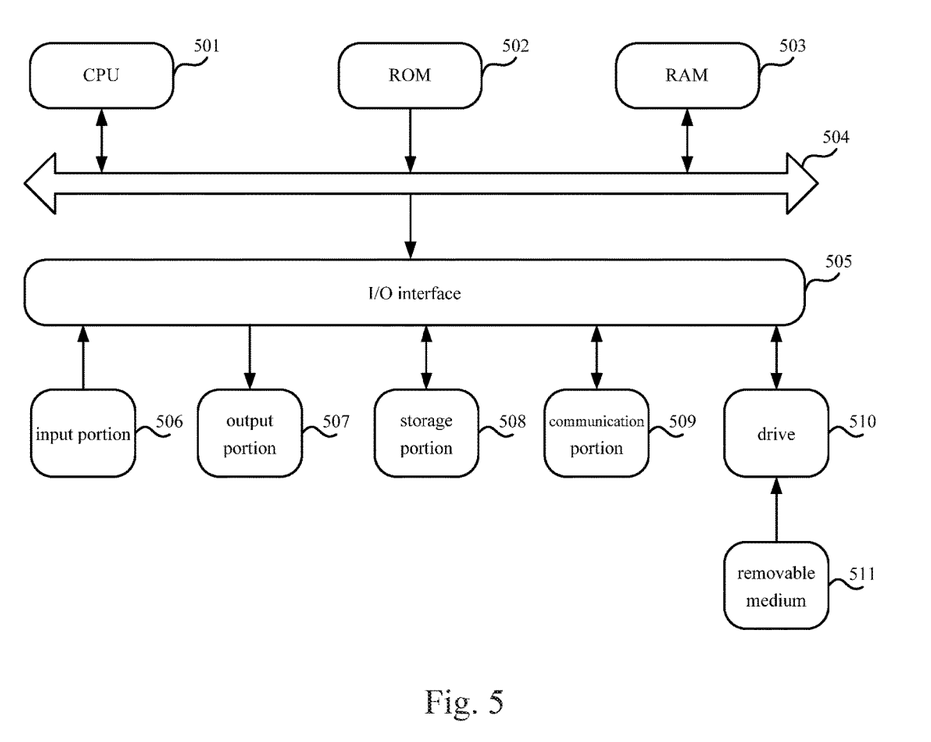
FIG. 5 shows a schematic structural diagram of an apparatus for recognizing a picture adapted to implement an embodiment of the present application.

Referring to FIG. 5, a schematic structural diagram of an apparatus 500 adapted to implement the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to FIGS. 2-3 may be implemented in a computer software program. For example, an embodiment of the present disclosure includes a computer program product, which comprises a computer program that is tangibly embedded in a machine-readable medium. The computer program comprises program codes for executing the method as illustrated in FIGS. 2-3. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software. The names of these units or modules are not considered as a limitation to the units or modules.

In another aspect, the present application further provides a computer storage medium. The non-volatile computer storage medium may be the non-volatile computer storage medium included in the apparatus in the above embodiments, or a stand-alone computer storage medium which has not been assembled into the apparatus. The computer storage medium stores one or more programs, the programs being executed by one or more computer processors to implement the method for recognizing a picture of the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for recognizing a pirated picture, comprising:
   acquiring a to-be-recognized picture from an Internet-based on-line database;
   extracting characteristics from the to-be-recognized picture and a previously acquired copy-righted picture, to obtain the characteristics of the to-be-recognized picture and the copy-righted picture, the extracted characteristics comprising a color characteristic and a shape characteristic, the color characteristic being characterized by a 64-dimensional histogram in HSV space of a color model; and the shape characteristic being characterized by 1024-dimensional scale-invariant characteristic transform (SIFT) of an image;
   comparing the extracted characteristics of the to-be-recognized picture and the copy-righted picture; and
   determining the to-be-recognized picture as a suspected pirated picture based on the comparison result;
   the comparing the extracted characteristics of the to-be-recognized picture and the copy-righted picture comprises:
   establishing characteristic indices of the characteristics of the to-be-recognized picture; and
   cross-comparing the extracted characteristics of the to-be-recognized picture and the copy-righted picture based on the characteristic indices.

2. The method according to claim 1, wherein the comparison result is a similarity between the copy-righted picture and the to-be-recognized picture; and
   the determining the to-be-recognized picture as a suspected pirated picture based on the comparison result comprises:
   determining the to-be-recognized picture among to-be-recognized pictures with a similarity to the copy-righted picture not less than a preset similarity threshold as the suspected pirated picture.

3. The method according to claim 1, wherein after the determining the to-be-recognized picture as a suspected pirated picture, the method further comprises:
   filtering the determined suspected pirated picture according to previously acquired information of non-suspected web sites, to obtain a filtered suspected pirated picture.

4. The method according to claim 3, further comprising sending the filtered suspected pirated information to a corresponding copyright owner.

5. A device for recognizing a pirated picture, the device comprising:
   at least one processor; and
   a memory storing instructions, which when executed by the at least one processor, cause the at least one processor to perform operations, the operations comprising:
   acquiring a to-be-recognized picture from an Internet-based on-line database;
   extracting characteristics from the to-be-recognized picture and a previously acquired copy-righted picture, to obtain the characteristics of the to-be-recognized picture and the copy-righted picture, the extracted characteristics comprising a color characteristic and a shape characteristic, the color characteristic being characterized by a 64-dimensional histogram in HSV space of a color model; and the shape characteristic being characterized by 1024-dimensional scale-invariant characteristic transform (SIFT) of an image;
   comparing the characteristics of the to-be-recognized picture and the copy-righted picture extracted by the characteristic extraction module; and
   determining the to-be-recognized picture as a suspected pirated picture based on the comparison result obtained by the characteristic comparison module;
   the comparing the extracted characteristics of the to-be-recognized picture and the copy-righted picture comprises:
   establishing characteristic indices of the characteristics of the to-be-recognized picture; and
   cross-comparing the extracted characteristics of the to-be-recognized picture and the copy-righted picture based on the characteristic indices.

6. The device according to claim 5, wherein the comparison result is a similarity between the copy-righted picture and the to-be-recognized picture; and
   the determining the to-be-recognized picture as a suspected pirated picture based on the comparison result comprises:
   determining the to-be-recognized picture among to-be-recognized pictures with a similarity to the copy-righted picture not less than a preset similarity threshold as the suspected pirated picture.

7. The device according to claim 5, wherein after the determining the to-be-recognized picture as a suspected pirated picture, the operations further comprise:
   filtering the suspected pirated the determined suspected pirated picture according to previously acquired information of non-suspected websites, to obtain a filtered suspected pirated picture.

8. The device according to claim 7, further comprising sending the filtered suspected pirated information to a corresponding copyright owner.

9. A non-transitory computer storage medium storing a computer program, which when executed by one or more processors, cause the one or more processors to perform operations for recognizing a pirated picture, the operations comprising:
   acquiring a to-be-recognized picture from an Internet-based on-line database;
   extracting characteristics from the to-be-recognized picture and a previously acquired copy-righted picture, to obtain the characteristics of the to-be-recognized picture and the copy-righted picture, the extracted characteristics comprising a color characteristic and a shape characteristic, the color characteristic being characterized by a 64-dimensional histogram in HSV space of a color model; and the shape characteristic being characterized by 1024-dimensional scale-invariant characteristic transform (SIFT) of an image;

comparing the extracted characteristics of the to-be-recognized picture and the copy-righted picture; and determining the to-be-recognized picture as a suspected pirated picture based on the comparison result;

the comparing the extracted characteristics of the to-be-recognized picture and the copy-righted picture comprises:

establishing characteristic indices of the characteristics of the to-be-recognized picture; and cross-comparing the extracted characteristics of the to-be-recognized picture and the copy-righted picture based on the characteristic indices.

10. The non-transitory computer storage medium according to claim 9, wherein the comparison result is a similarity between the copy-righted picture and the to-be-recognized picture; and the determining the to-be-recognized picture as a suspected pirated picture based on the comparison result comprises:

determining the to-be-recognized picture among to-be-recognized pictures with a similarity to the copy-righted picture not less than a preset similarity threshold as the suspected pirated picture.

11. The non-transitory computer storage medium according to claim 9, wherein after the determining the to-be-recognized picture as a suspected pirated picture, the operations further comprise:

filtering the determined suspected pirated picture according to previously acquired information of non-suspected web sites, to obtain a filtered suspected pirated picture.

12. The non-transitory computer storage medium according to claim 11, the operations further comprising sending the filtered suspected pirated information to a corresponding copyright owner.

* * * * *